United States Patent
Shimokawa

(10) Patent No.: US 11,367,005 B2
(45) Date of Patent: Jun. 21, 2022

(54) OPTIMIZATION CALCULATION METHOD AND OPTIMIZATION CALCULATION APPARATUS

(71) Applicant: FUJITSU LIMITED, Kawasaki (JP)

(72) Inventor: Satoshi Shimokawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 680 days.

(21) Appl. No.: 16/374,883

(22) Filed: Apr. 4, 2019

(65) Prior Publication Data
US 2019/0325320 A1     Oct. 24, 2019

(30) Foreign Application Priority Data

Apr. 24, 2018   (JP) .............................. JP2018-083299

(51) Int. Cl.
| | |
|---|---|
| *G06F 12/08* | (2016.01) |
| *G16B 40/00* | (2019.01) |
| *G06Q 10/00* | (2012.01) |
| *G06N 3/12* | (2006.01) |
| *G06F 17/11* | (2006.01) |

(52) U.S. Cl.
CPC .............. *G06N 3/126* (2013.01); *G06F 17/11* (2013.01)

(58) Field of Classification Search
CPC ...... G06N 3/126; G06N 3/086; G06K 9/6231; G06F 2111/06; G06F 30/20
USPC ....................................................... 706/1–62
See application file for complete search history.

(56) References Cited

U.S. PATENT DOCUMENTS

| | | | |
|---|---|---|---|
| 2002/0156752 A1 | 10/2002 | Torii et al. | |
| 2008/0120129 A1* | 5/2008 | Seubert | G06Q 10/10 705/35 |
| 2012/0196261 A1* | 8/2012 | Kim | G09B 7/02 434/322 |
| 2012/0254842 A1* | 10/2012 | Henderson | G06F 8/76 717/136 |
| 2013/0272386 A1* | 10/2013 | Yu | H04N 19/147 375/240.03 |

(Continued)

FOREIGN PATENT DOCUMENTS

| | | |
|---|---|---|
| JP | 2002-312755 | 10/2002 |
| JP | 2009-175925 | 8/2009 |
| JP | 2014-160399 | 9/2014 |

*Primary Examiner* — Brandon S Cole
(74) *Attorney, Agent, or Firm* — Fujitsu Patent Center

(57) ABSTRACT

An optimization calculation method includes, generating individuals of a present generation with an individual selected in a previous generation as a parent individual using an algorithm for obtaining optimum solutions while evolving a plurality of individuals for each generation, evaluating each individual of the present generation, setting a constraint condition value of the present generation based on a constraint condition value of one generation before with respect to the present generation, and a constraint condition provisional value achieved by a half or more of individuals used for generating child individuals of a next generation, determining whether an evaluation result of each individual satisfies a constraint condition value of the present generation, changing for lowering an evaluation result of individuals which do not satisfy the constraint condition value of the present generation, and selecting individuals to be solution candidates from among individuals on which the determination or change process is performed.

8 Claims, 10 Drawing Sheets

(56) References Cited

U.S. PATENT DOCUMENTS

| | | | |
|---|---|---|---|
| 2016/0171153 A1* | 6/2016 | van Rooyen | G16B 40/00 |
| | | | 702/20 |
| 2016/0306922 A1* | 10/2016 | van Rooyen | H04L 67/10 |
| 2016/0306923 A1* | 10/2016 | van Rooyen | G06N 3/002 |
| 2017/0249744 A1* | 8/2017 | Wang | G06T 7/11 |
| 2019/0265976 A1* | 8/2019 | Goryavskiy | G06F 9/30058 |

* cited by examiner

FIG. 7

| INDIVIDUAL NO. | LOSS [W] (OBJECTIVE FUNCTION) | INDUCTANCE [H] |
|---|---|---|
| 1 | 2.80E-05 | 4.17E-05 |
| 2 | 2.63E-05 | 4.08E-05 |
| 3 | 2.71E-05 | 4.08E-05 |
| ⋮ | ⋮ | ⋮ |
| 24 | 2.54E-05 | 3.93E-05 |
| 25 | 2.56E-05 | 3.93E-05 | → $L_i'$
| 26 | 2.71E-05 | 3.92E-05 |
| ⋮ | ⋮ | ⋮ |
| 49 | 2.63E-05 | 3.87E-05 |
| 50 | 2.59E-05 | 3.87E-05 |
| ⋮ | ⋮ | ⋮ |

OPTIMIZATION CALCULATION METHOD AND OPTIMIZATION CALCULATION APPARATUS

CROSS-REFERENCE TO RELATED APPLICATION

This application is based upon and claims the benefit of priority of the prior Japanese Patent Application No. 2018-83299, filed on Apr. 24, 2018, the entire contents of which are incorporated herein by reference.

FIELD

The embodiments discussed herein are related to an optimization calculation method and an optimization processing apparatus.

BACKGROUND

For the problem in which conformity to a constraint condition is found after evaluation to solution candidates, a method of applying a genetic algorithm for obtaining the optimum solutions while evolving a plurality of solution candidates (individuals) for each generation has been offered.

For example, a genetic algorithm is applied to a time schedule problem concerning a power supply and consumption when contract power (upper limit) is given as a constraint condition (see, for example, Japanese Laid-open Patent Publication No. 2014-160399). In this method, even when the electric power at the time of generating the initial population does not satisfy (surpasses) the contract power, the optimum solutions that satisfy the constraint condition are searched for by proceeding with the evolution of individuals in a direction gradually approaching the contract power. In this method, the constraint condition is updated during the optimization calculation. For example, a rule that defines constraint conditions with a predetermined number of generations or a rule that updates a constraint condition when each (all) individual falls below a predetermined value is used as the update rule.

SUMMARY

According to an aspect of the embodiments, an optimization calculation method includes, generating individuals of a present generation with an individual selected in a previous generation as a parent individual using an algorithm for obtaining optimum solutions while evolving a plurality of individuals for each generation, evaluating each individual of the present generation, setting a constraint condition value of the present generation based on a constraint condition value of one generation before with respect to the present generation, and a constraint condition provisional value achieved by a half or more of individuals used for generating child individuals of a next generation, determining whether an evaluation result of each individual satisfies a constraint condition value of the present generation, changing for lowering an evaluation result of individuals which do not satisfy the constraint condition value of the present generation, and selecting individuals to be solution candidates from among individuals on which the determination or change process is performed.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 7 is a diagram illustrating an example of evaluation results of each individual in the i-th generation;

DESCRIPTION OF EMBODIMENTS

In a case where a rule stipulating constraint conditions with a predetermined number of generations is adopted, it is required to preset the update profile of the constraint condition before the optimization calculation. However, if the update pace of the constraint condition is too fast, individuals may not satisfy the constraint condition, and only non-conforming solution group may be obtained. If the update pace of the constraint condition is too late, extra calculation time is required. In this way, it is difficult to properly predict the update profile of the constraint condition before the optimization calculation is performed.

In a case where a rule for updating the constraint condition is adopted when each (all) individual falls below the predetermined value, particularly when child individuals are generated in a direction deviating from the constraint condition by mutation, it is not possible to update the constraint condition to the next value until all individuals satisfy the constraint condition. For this reason, in the case where a rule for updating the constraint condition is adopted when each individual (all) falls below a predetermined value, a long calculation time is required.

The optimization calculation method, the optimization calculation program, and the optimization calculation device disclosed in the embodiments will be described below in detail with reference to the drawings. The embodiments are one example, and the configuration and the like are not limited.

Embodiments

An Example of Optimization Calculation Device

As the optimization calculation device of the first embodiment, an optimization calculation device that performs an optimum calculation process for obtaining optimum solutions using a genetic algorithm for obtaining the optimum solutions while evolving a plurality of individuals as solution candidates for each generation will be described as an example. The optimization calculation device according to the first embodiment calculates solution candidates for a problem in which conformity to a constraint condition is found after evaluation of the individual. On this occasion, the optimization calculation device of the first embodiment obtains steadily and rapidly the optimum solutions by dynamically changing the constraint condition for each generation for a problem in which conformity to the constraint condition is found after evaluation of the individual.

Figure 1:
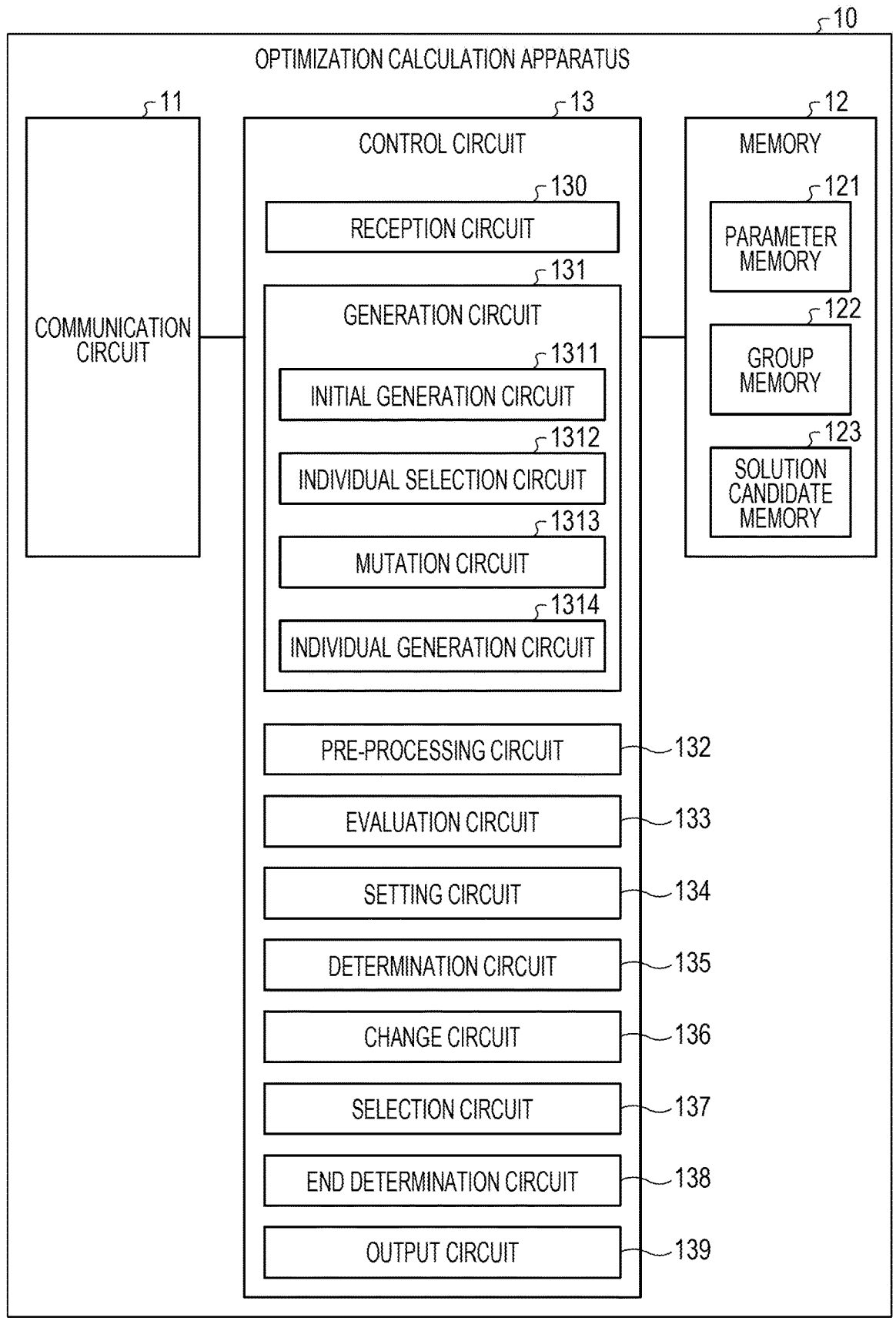
FIG. 1 is a block diagram illustrating an example of a configuration of an optimization calculation device according to a first embodiment.

FIG. 1 is a block diagram illustrating an example of a configuration of the optimization calculation device according to the first embodiment. As illustrated in FIG. 1, an optimization calculation device 10 according to the first embodiment includes a communication circuit 11, a memory 12, and a control circuit 13. Hereinafter, the count number of generations is i ($1 \leq i \leq Q$).

The communication circuit 11, which is a processing circuit that controls communication with other devices, is, for example, a communication interface. The communication circuit 11 receives, from another device, receives various pieces of information such as an optimization calculation instruction, group data used for calculation of genetic algorithm, a pre-constraint condition to be used for an optimization calculation process, a target value of the characteristics, information of the characteristics to be an objective function, calculation formula to obtain the characteristics, and an end condition of the optimization calculation process.

The memory 12, which is a storage device that stores programs, data, and the like, is, for example, a memory or a hard disk. The memory 12 includes a parameter memory 121, a group memory 122, and a solution candidate memory 123.

The parameter memory 121 stores various parameters relating to the optimization calculation process. The parameters include the number of individuals to be generated using the genetic algorithm, the pre-constraint condition used for the optimization calculation process, the constraint condition of each generation set in the course of the optimization calculation, the target value, the evaluation result of the individual, the end condition of the optimization calculation process, and the like.

The number of individuals to be generated is information for setting how many new individuals are to be generated in a mutation circuit 1313 (described later). The end condition is a condition for ending the optimization calculation process. The end condition is, for example, a condition in which the generation (i) that has performed calculation has reached the upper limit (Q) of the number of generations, and so on.

The group memory 122 stores group data to be used for the genetic algorithm.

The solution candidate memory 123 stores, in each generation, individuals (solution candidates) selected as candidates of the solution of the optimization problem. The individuals selected as solution candidates are used as parent individuals of the next generation for the generation at the time of selection.

The control circuit 13, which is a processing circuit that governs the entire optimization calculation device 10, is, for example, a processor or the like. The control circuit 13 includes, for example, a reception circuit 130, a generation circuit 131, a pre-processing circuit 132, an evaluation circuit 133, a setting circuit 134, a determination circuit 135, a change circuit 136, a selection circuit 137, an end determination circuit 138, and an output circuit 139.

The reception circuit 130 accepts an optimization calculation instruction, various parameters used for optimization calculation, group data used for a genetic algorithm, and the like. The reception circuit 130 stores various parameters used for optimization calculation in the parameter memory 121. The reception circuit 130 stores the group data in the group memory 122.

Using the genetic algorithm, the generation circuit 131 generates the individuals of the present generation with the individuals selected in the previous generation as a parent individual. The generation circuit 131 generates, for each generation, new individuals by the genetic operation in the genetic algorithm. The genetic operation is an operation of applying crossover or mutation to comparatively superior individuals. The generation circuit 131 includes an initial generation circuit 1311, an individual selection circuit 1312, a mutation circuit 1313, and an individual generation circuit 1314.

The initial generation circuit 1311 generates individuals of the first generation. For example, the initial generation circuit 1311 randomly selects an individuals from the group, and performs a genetic operation on the selected individual, thereby generating a predetermined number of initial individuals. For example, the initial generation circuit 1311 selects one individual from the group, and performs a genetic operation on the one individual to generate 100 individuals as the evaluation individuals of the first generation.

The individual selection circuit 1312 selects, in the second and subsequent generations, a parent individual to be genetically operated from among individuals selected in the previous generation. The individual selection circuit 1312 performs a binary tournament selection in which a parent individual from among the individuals selected in the previous generation is selected. The binary tournament is a process in which a predetermined number of individuals are randomly selected from among individuals selected in the previous generation, and the individual having the highest conformity among them is selected as a parent individual.

The mutation circuit 1313 applies, to the parent individual selected by the individual selection circuit 1312, crossover or mutation, which is a genetic operation, to generate child individuals. Mutation is generated completely randomly. The individual generation circuit 1314 outputs the individuals generated by the mutation circuit 1313 as evaluation individuals of the present generation.

The pre-processing circuit 132 modifies the parameter of each individual of the present generation so that the individuals conform to the preset pre-constraint condition (for example, parameters such as design conditions) among the constraint conditions.

The evaluation circuit 133 evaluates each individual of the present generation. The evaluation circuit 133 performs simulation and the like to evaluate the characteristics of each individual. The evaluation circuit 133 obtains, for each individual, the characteristic value corresponding to the objective function and the characteristic value corresponding to the constraint condition in the optimization calculation process as the evaluation value.

The setting circuit 134 sets the constraint condition value of the present generation based on the constraint condition value of one generation before with respect to the present generation, and the constraint condition provisional value achieved by a half or more of the individuals used for generating the child individuals of the next generation. For example, the setting circuit 134 sets the constraint condition value $L_i$ of the present generation (i-th generation) using Equation (1).

$$L_i = (1-k) \times L_i + K \times L_i' \tag{1}$$

where $L_i$: Constraint condition value of the present generation, $L_{i-1}$: Constraint condition value of one generation before, $L_i'$: Constraint condition provisional value achieved by a half or more of the individuals used for generating the child individuals of the next generation K: Any coefficient on the progress of evolution.

The coefficient K ($0 < K \le 1$) is any value relating to the progress of evolution. When the coefficient K is large, the evolution proceeds fast, and when the coefficient K is small, the evolution proceeds moderately. This coefficient K is set based on the relationship with the resource the optimization calculation device 10 and the calculation time. The coefficient K may be the same for all generations, or may be updated for each generation. For example, in the first embodiment, it is possible to set the coefficient K as the variable $K_i$ corresponding to each generation i.

In this way, the setting circuit 134 dynamically changes, for each generation, the constraint condition using the value achieved by a half or more of the individuals used for generating the individuals of the next generation.

When the present generation is the first generation, the setting circuit 134 more increases the proportion of individuals that satisfy the constraint condition with the constraint condition value of the first generation set to a value less than the constraint condition provisional value. In a case where $L_i$ obtained by using Equation (1) is equal to or larger than the final target constraint condition value $L_{tgt}$, the setting circuit 134 sets the constraint condition value $L_i$ of the i-th generation to $L_{tgt}$.

The determination circuit 135 determines, for each individual of the present generation, whether the evaluation result satisfies the constraint condition value of the present generation. The determination circuit 135 determines, for each individual of the i-th generation, whether the evaluation value calculated in the simulation satisfies the constraint condition value $L_i$ set by the setting circuit 134.

The change circuit 136 makes a change to lower the evaluation result of the individuals that do not satisfying the constraint condition value of the present generation. In order to promote the selection of the individuals determined by the determination circuit 135 not to satisfy the constraint condition value of the present generation, the change circuit 136 lowers the evaluation result of these individuals. For example, the change circuit 136 deletes the individuals determined not to satisfy the constraint condition value. Alternatively, the change circuit 136 lowers the ranking or evaluation value of the individuals determined to not satisfy the constraint condition value.

The selection circuit 137 selects the individuals to be the solution candidates from among the individuals on which the determination process by the determination circuit 135 or the change process by the change circuit 136 has been performed. For example, the selection circuit 137 selects a Pareto solution from among individuals on which the determination process or the change process has been performed, and individuals that have been regarded as the Pareto solution candidates in one generation before with respect to the present generation to perform solution candidate selection by end cutting processing or solution candidate selection by ranking.

The end determination circuit 138 determines whether the end condition is satisfied. The end determination circuit 138 determines whether the present generation on which the calculation has been performed has reached the upper limit of the number of generations. In a case where the end determination circuit 138 determines that the end condition is not satisfied, the optimization calculation device 10 causes the process to proceed to the next generation, and continues the optimization calculation process. For example, the optimization calculation device 10 counts up the number of generations, and causes the generation circuit 131, the pre-processing circuit 132, the evaluation circuit 133, the setting circuit 134, the determination circuit 135, the change circuit 136, and the selection circuit 137 to perform the process. In a case where the end determination circuit 138 determines that the end condition is satisfied, the optimization calculation device 10 ends the optimization calculation process.

The output circuit 139 outputs the solution candidates selected in the last generation as the optimum solutions, and ends the optimization calculation process. The output circuit 139 outputs the optimum solutions to the another device as the instruction source, for example, via the communication circuit 11.

Processing Procedure of Optimization Calculation Process

Figure 2:
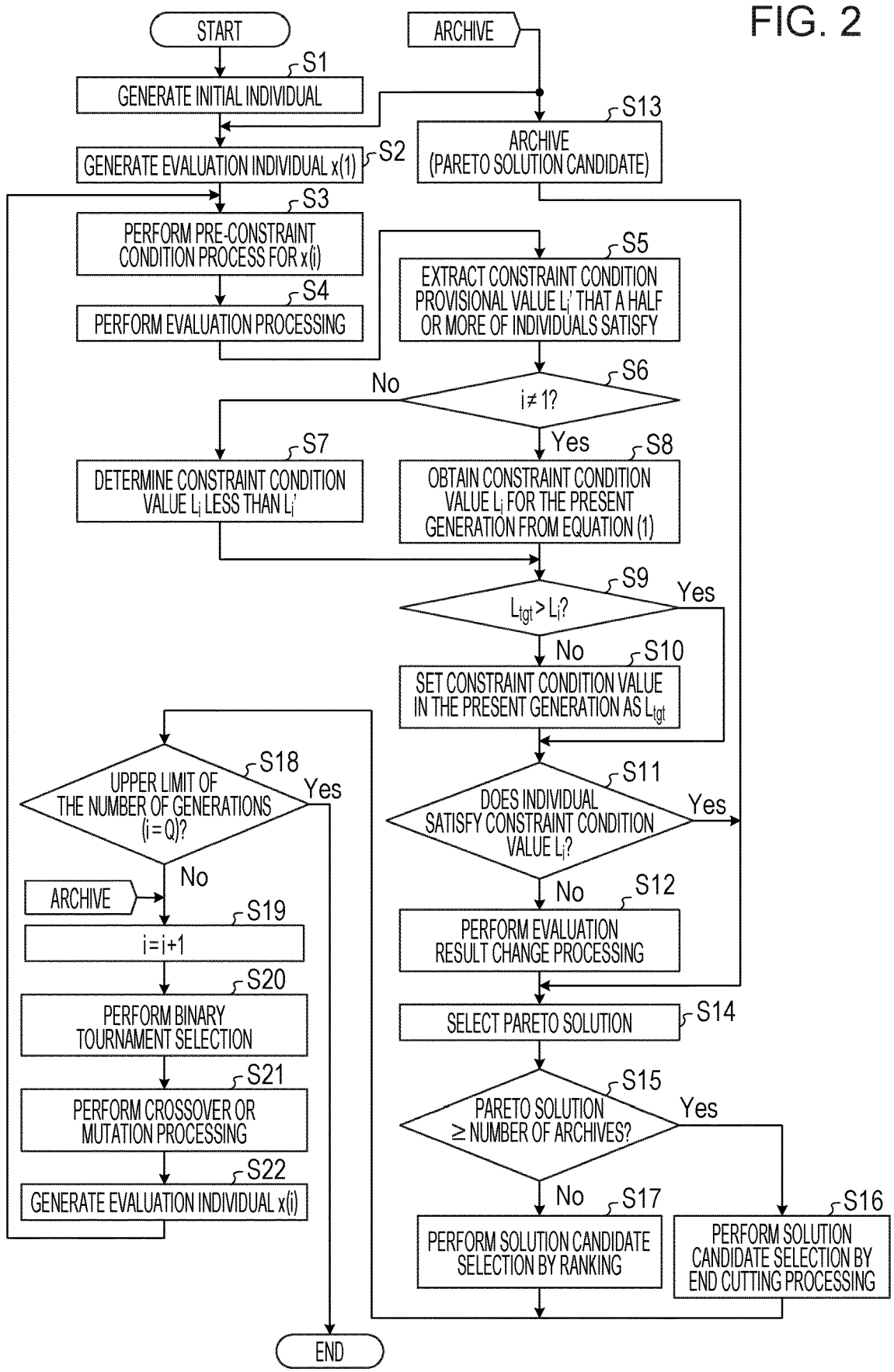
FIG. 2 is a flowchart illustrating the processing procedure of an optimization calculation process of the first embodiment.

Next, referring to FIG. 2, the processing procedure of the optimization calculation process of the first embodiment will be described. FIG. 2 is a flowchart illustrating a processing procedure of optimization calculation process.

As illustrated in FIG. 2, in the optimization calculation device 10, first, the initial generation circuit 1311 randomly selects individuals from the group to generate the initial individuals (step S1), and performs an genetic operation to generate the first generation evaluation individuals x(1) (step S2).

Subsequently, the pre-processing circuit 132 performs, for the evaluation individual x(i) an pre-constraint condition process such as the dimensional constraint (step S3). By performing the simulation and the like the evaluation circuit 133 performs an evaluation process for evaluating the characteristics of each individual of the i-th generation (step S4).

The setting circuit 134 extracts the constraint conditions satisfied by a half or more of the individuals to be archived, for example, the constraint condition provisional value $L_i'$ achieved by more than half of the individuals used for generating the child individuals of the next generation (step S5). Subsequently, the setting circuit 134 determines whether i≠1 (step S6). When determining that i≠1 (step S6: "No"), the setting circuit 134 determines the constraint condition value $L_i$ less than the constraint condition provisional value $L_i'$ (step S7). When the setting circuit 134 determines that i≠1 (step S6: "Yes"), the setting circuit 134 obtains the constraint condition value $L_i$ in the present generation from Equation (1) (step S8).

Subsequently, the setting circuit 134 compares the constraint condition value $L_i$ obtained in step S7 or step S8 with the final target constraint condition value $L_{tgt}$, to determine whether $L_{tgt} > L_i$ (step S9). When it is determined that $L_{tgt} > L_i$ is not satisfied (step S9: "No"), the setting circuit 134 sets the constraint condition value of the i-th generation to $L_{tgt}$ (step S10).

When the setting circuit 134 determines that $L_{tgt} > L_i$ is satisfied (step S9: "Yes"), or after the step S10 is ended, the determination circuit 135 determines, for each individual of the i-th generation, whether the evaluation value calculated in the simulation satisfies the constraint condition value $L_i$ (step S11).

The change circuit 136 performs, for the individual whose evaluation value is determined by the determination circuit 135 not to satisfy the constraint condition value $L_i$ (step S11: "No"), the evaluation result change process (step S12) to lower the evaluation result of the individual that does not satisfy the constraint condition value $L_i$.

The selection circuit 137 reads the individuals that have been regarded as the Pareto solution candidates in one generation before (step S13), and selects the Pareto solutions from the individuals on which the determination process or the evaluation result change process has been performed, and the read individuals (step S14).

The selection circuit 137 determines whether the number of Pareto solutions is equal to or larger than the number of archives (step S15). When the selection circuit 137 determines that the number of Pareto solutions is equal to or larger than the number of archives (step S15: "Yes"), the selection circuit 137 performs solution candidate selection by end cutting processing so that the distribution of the solution candidates is dispersed (step S16). On the other hand, when it is determined that the number of Pareto solutions is less than the number of archives (step S15: "No"), the selection circuit 137 performs solution candidate selection by ranking (step S17).

Subsequently, the end determination circuit 138 determines whether the upper limit of the number of generations has been reached, for example, whether i=Q or not (step S18). When it is determined that i=Q is not satisfied (step S18: "No"), the end determination circuit 138 archives the solution candidates selected by the selection circuit 137, then sets i=i+1 (step S19) in order to cause the process to proceed to the next generation, and counts up the number of generations.

In the generation circuit 131, the individual selection circuit 1312 performs a binary tournament selection (step S20) to select the parent individual. The mutation circuit 1313 performs, on the parent individual selected from the individual selection circuit 1312, crossover or mutation processing (step S21) to generate child individuals. The individual generation circuit 1314 sets the individuals generated by the mutation circuit 1313 as the evaluation individuals of the present generation (step S22). After that, the optimization calculation device 10 performs the process of step S3 and the subsequent steps on the generated individuals.

On the other hand, when the end determination circuit 138 determines that i=Q (step S18: "Yes"), the output circuit 139 outputs the solution candidates selected in the last generation as the optimum solutions, and ends the optimization calculation process.

Application Example

The case where the optimization calculation method of the first embodiment is applied to the solution to the shape optimization problem of the inductor core, which is one of the magnetic devices, will be described.

Figure 3A:
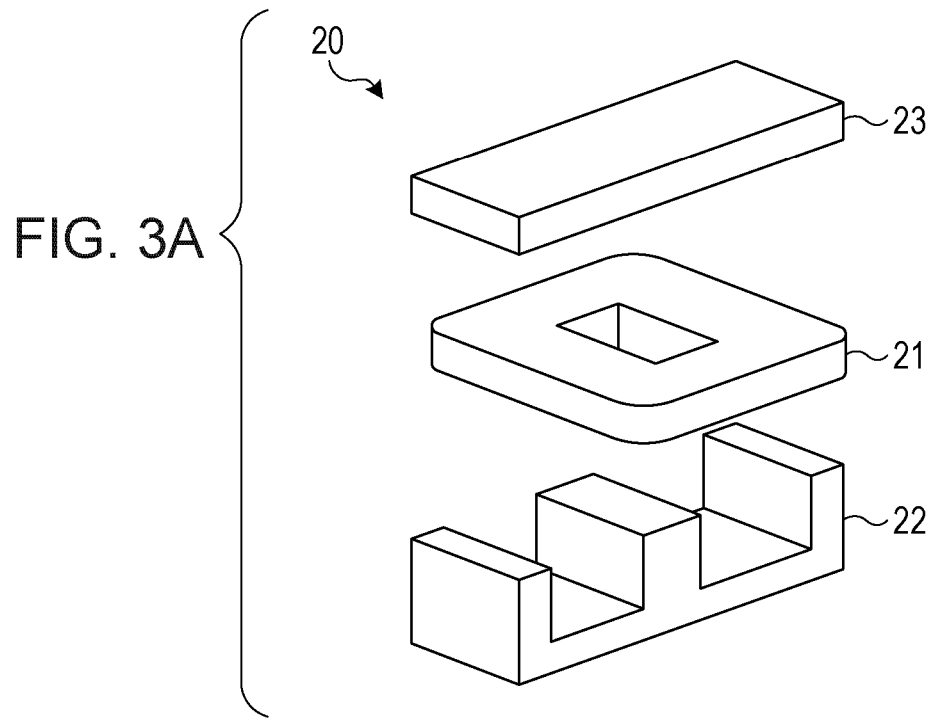
FIG. 3A is a perspective view of an inductor core which is an example of a shape optimization target according to the first embodiment.
Figure 3B:
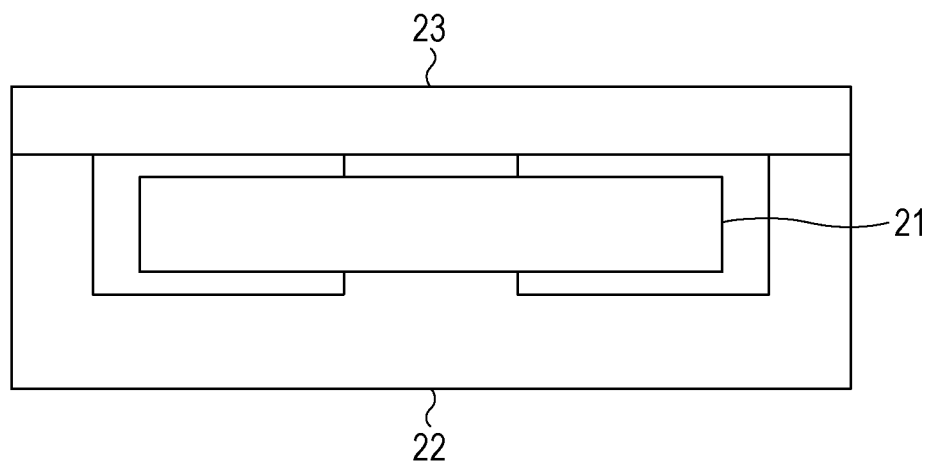
FIG. 3B is a front view of the inductor core which is an example of the shape optimization target according to the first embodiment.
Figure 4:
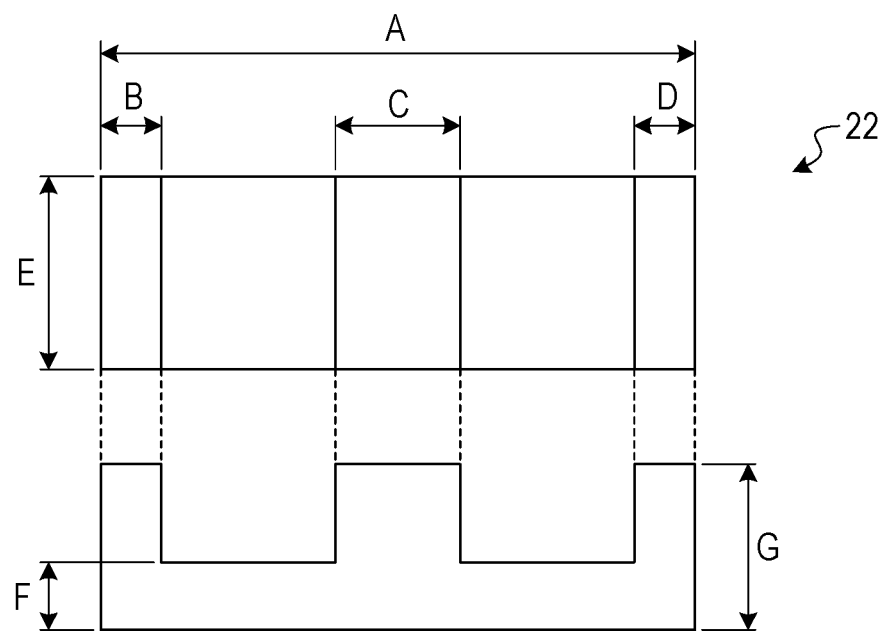
FIG. 4 is a plan view and a front view of an E-shaped core illustrated in FIGS. 3A and 3B.
Figure 5:
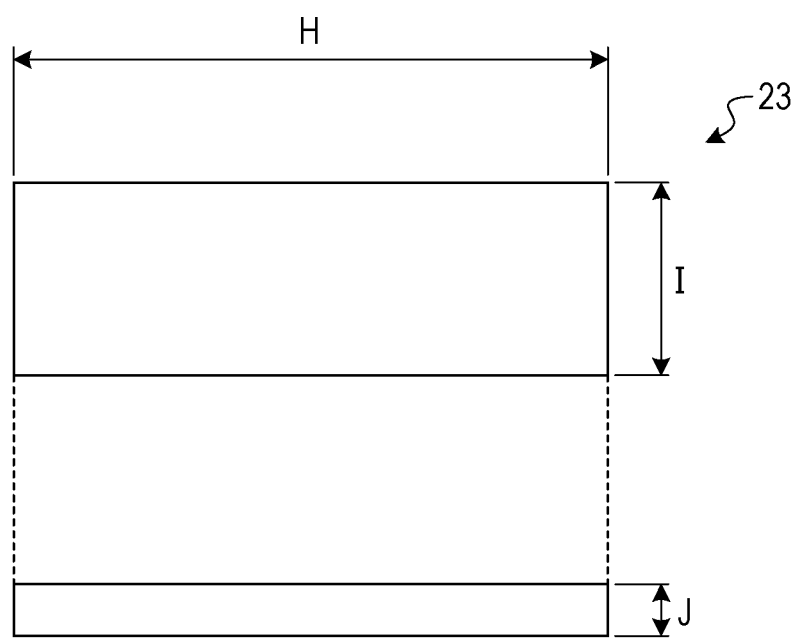
FIG. 5 is a plan view and a front view of an I-shaped core illustrated in FIGS. 3A and 3B.

First, an example of an inductor core will be described. FIG. 3A is a perspective view of an inductor core which is an example of a shape optimization target according to the first embodiment. FIG. 3B is a front view of the inductor core which is an example of the shape optimization target according to the first embodiment. FIG. 4 is a plan view and a front view of an E-shaped core 22 illustrated in FIGS. 3A and 3B. FIG. 5 is a plan view and a front view of an I-shaped core 23 illustrated in FIGS. 3A and 3B.

As illustrated in FIGS. 3A to 5, an inductor core 20 whose the E-shaped core 22 and the I-shaped core 23 are formed of a ferrite-based magnetic material generates a magnetic flux by passing an electric current through a coil 21 wound around the central leg, and generates the inductance (L value) required in the electric circuit.

The inductor core 20 is used as a part of a circuit. For this reason, in addition to being required to satisfy a desired inductance value, the inductor core 20 is required to have a size within a predetermined dimension, and have loss and volume (weight) within the magnetic substance both of which are as small as possible. In this example, the design optimization problem of the inductor core 20 is solved in which loss and volume are minimized while setting upper and lower limit values of the dimensions of the E-shaped core 22 and the I-shaped core 23 (A to J) (see FIGS. 4 and 5), and the lower limit value of the inductance as the constraint condition. Therefore, in this application example, loss and volume are the objective function.

In this application example, the group data includes the material name of the member of each individual, the permittivity and permeability, and the design variable which is a combination of each dimension (A to J). In this application example, various pieces of information used for the optimization calculation includes the dimensional condition (upper and lower limits) of each member of the inductor core 20, the target inductance (lower limit), and the coefficient of the arithmetic Equation for calculating magnetic loss and the coefficient of the arithmetic Equation for calculating volume of the inductor core, which are the objective function.

Figure 6:
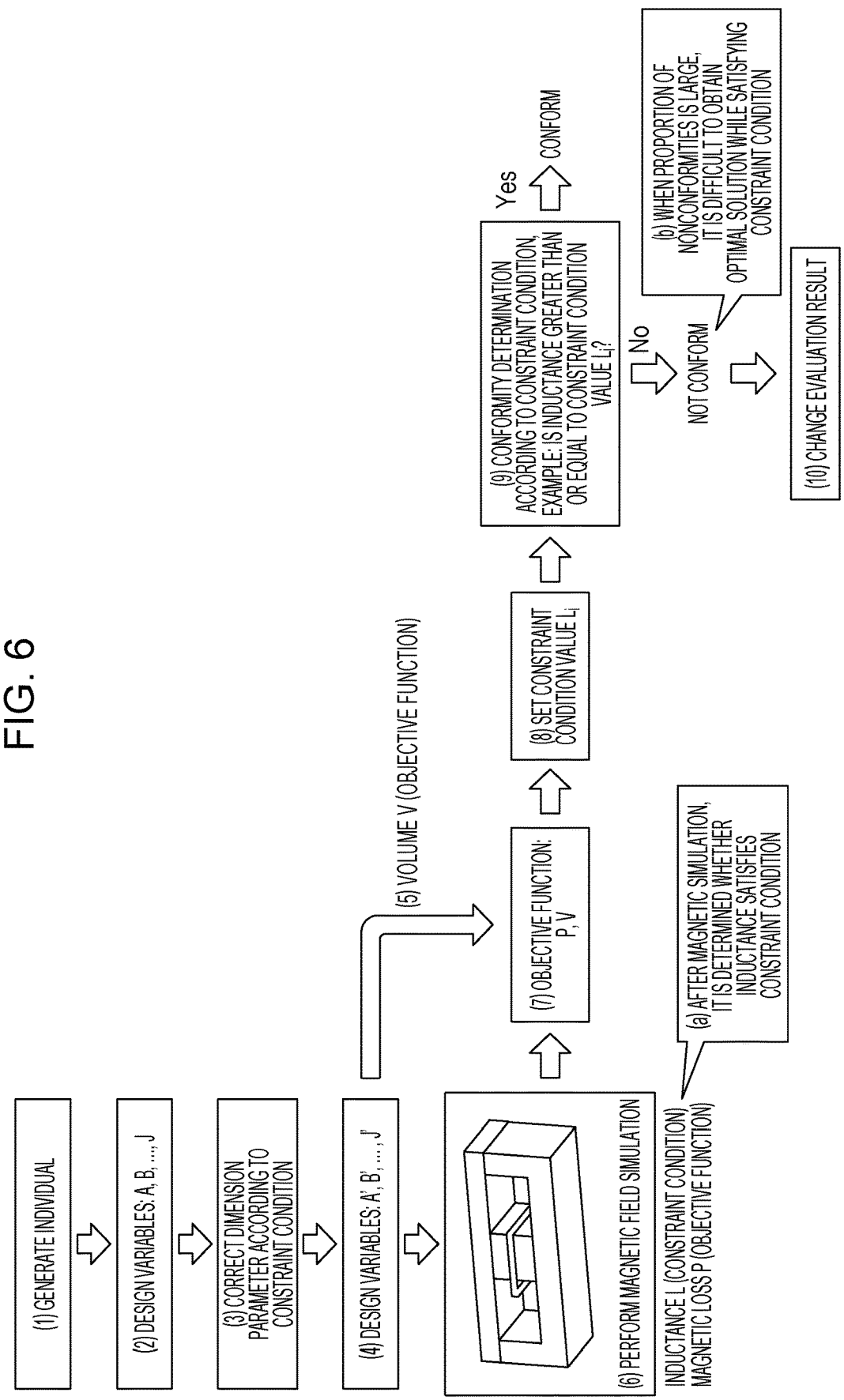
FIG. 6 is a diagram for explaining the flow of a size optimization process of an inductor core.

FIG. 6 is a diagram for explaining the flow of a size optimization process of an inductor core. For example, the optimization calculation device 10 performs an optimum design by utilizing magnetic field simulation based on a three-dimensional model. In the i-th generation, each process is performed with the flow illustrated in FIG. 6.

First, the generation circuit 131 generates individuals of the i-th generation (see (1) in FIG. 6) and gives the size (A, B, ..., J) of each individual as design variables (see (2) in FIG. 6). When the dimensions of each individual is out of the constraint condition of the dimensions, the pre-processing circuit 132 applies the limit at the upper and lower limit values of the dimensions, and performs the dimensional parameter correction by the dimensional constraint condition (see (3) in FIG. 6). As a result, the design variable is changed to (A', B', ..., J') (see (4) in FIG. 6).

At this point, it is possible to calculate the volume (V) which is one of objective functions (see (5) in FIG. 6). Subsequently, the evaluation circuit 133 performs the magnetic field simulation (see (6) in FIG. 6).

In this magnetic field simulation, many programs are created based on the MAXWELL equation. This MAXWELL equation is a simultaneous partial differential equation illustrated in Equations (2) to (5). D has a linear relationship with E as illustrated in equation (6), and B has a linear relationship with H as illustrated in equation (7).

$$\nabla \times H = j + \partial D / \partial t \quad (2)$$

$$\nabla \times E = -\partial B / \partial t \quad (3)$$

$$\nabla \cdot B = 0 \quad (4)$$

$$\nabla \cdot D = \rho \quad (5)$$

$$D = \varepsilon E \quad (6)$$

$$B = \mu H \quad (7)$$

where E: Strength of electric field,
B: Magnetic flux density,
D: Electric flux density,
H: Strength of magnetic field,
ρ: Charge density,
j: Current density,
∇: Divergence of vector field,
∇×: Rotation of vector field,
ε: Dielectric constant of medium, and
μ: Permeability of the medium.

The evaluation circuit 133 calculates, by performing the magnetic field simulation, the inductance (L), which is one of the constraint conditions, and the loss (P), which is an objective function (see (6) and (7) in FIG. 6). The setting circuit 134 sets the constraint condition value of the i-th generation (see (8) in FIG. 6).

In the genetic algorithm, a population (composed of, for example, tens to hundreds of individuals) is generated for each generation, and the individuals of the next generation are generated by applying crossover or mutation to relatively superior individuals. For this reason, in the genetic algorithm, all individuals are not required to satisfy the constraint condition. However, in the genetic algorithm, stochastically, it may be said that it is difficult to satisfy the constraint condition as well as minimize the objective function unless generations are developed under conditions that at least half of the population satisfy the constraint condition. For example, in the genetic algorithm, it is difficult to obtain optimum solutions while satisfying the constraint condition in a case where the proportion of nonconformities is large (see (b) in FIG. 6).

Therefore, in the first embodiment, the constraint condition is set for each generation by utilizing the fact that the population of the next generation evolves stochastically in a direction satisfying the constraint condition when the mutation is due to complete random number generation in a case where a majority of individuals of a generation satisfy the constraint condition. For example, the setting circuit 134 refers to the inductance of each individual obtained by the magnetic field simulation to obtain the inductance value (constraint condition provisional value $L_i'$) achieved by a half or more of the individuals used for generating the child individuals of the next generation.

FIG. 7 is a diagram illustrating an example of evaluation results of each individual in the i-th generation. In FIG. 7, sort processing is performed in descending order of the inductance. In this example, 50 individuals are used for generating the child individuals of the next generation. For this reason, the setting circuit 134 obtains, as the constraint condition provisional value $L_i'$, the inductance "3.93E05 [H]" of the 25th individual, which corresponds to half of 50. When a half or more of the individuals conform to the constraint condition, stochastically, the individuals of the next generation will evolve in a direction that satisfies the constraint condition, so that the setting circuit 134 may take a tradeoff with the calculation amount and set, for example, the inductance of the 30th or 40th individual as $L_i'$.

The setting circuit 134 applies the constraint condition provisional value $L_i'$, and the constraint condition value $L_{i-1}$ of the (i−1)-th generation to Equation (1) to obtain the constraint condition value $L_i$ of the i-th generation.

When the coefficient K is large, the evolution proceeds fast, and when the coefficient K is small, the evolution proceeds moderately. For example, when the coefficient K is suppressed to about 0.3, it is expected that the evolution proceeds stably, that is, the evolution proceeds, for example, to more increase the proportion of the individuals that satisfy the constraint condition. When the coefficient K is increased to about 0.7, it is expected that the evolution is accelerated and the calculation time is shortened. In this way, the coefficient K may be flexibly set to a value that matches the speed of evolution and stability.

In the first embodiment, this coefficient K may be set to be the same for all generations. In the first embodiment, the coefficient K may be updated for each generation. For example, the coefficient K may be set to a variable $K_i$ corresponding to each generation i. For example, the setting circuit 134 defines $K_i$ as a value which decreases as generations proceed. In this case, the first half generation evolved relatively moderately and steadily, and the evolution progresses fast as the generation proceeds, so that it is possible to shorten the calculation time.

For the first generation the setting circuit 134 more increases the proportion of the individuals that satisfy the constraint condition by setting the constraint condition value $L_i$ to a value less than the constraint condition provisional value $L_i'$. For example, for the first generation the setting circuit 134 sets the constraint condition value $L_1$ to a value that all individuals satisfy. In a case where $L_i$ obtained by using Equation (1) is equal to or larger than the final target constraint condition value $L_{tgt}$, the setting circuit 134 sets the constraint condition value $L_i$ of the i-th generation to $L_{tgt}$.

Subsequently, returning to FIG. 6, the determination circuit 135 performs a conformity determination according to the constraint condition (see (9) in FIG. 6). Specifically, for each individual of the i-th generation, the determination circuit 135 determines whether the inductance value calculated in the simulation is equal to or larger than the constraint condition value $L_i$.

In a case where the determination circuit 135 determines that the inductance value calculated in the simulation is equal to or larger than the constraint condition value $L_i$ ((9) in FIG. 6: "Yes"), the determination circuit 135 determines that this individual is conforming. On the other hand, in a case where the determination circuit 135 determines that the inductance value is less than the constraint condition value $L_i$ ((9) in FIG. 6: "No"), the determination circuit 135 determines that this individual is nonconforming.

In the first embodiment, the change circuit 136 intentionally changes the evaluation result so as to lower the evaluation result for the individuals that do not satisfy the constraint condition value in order to promote the selection of the individuals (see (10) in FIG. 6).

Figure 8A:
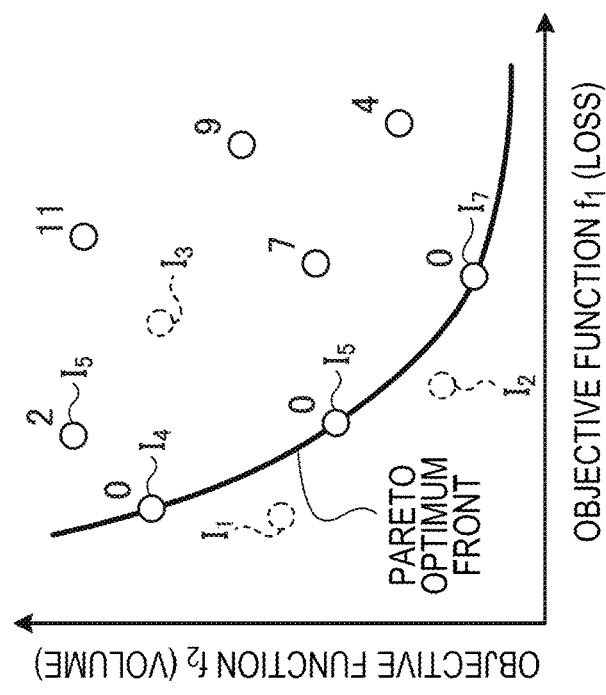
FIGS. 8A and 8B are diagrams for explaining an evaluation result change process.
Figure 8B:
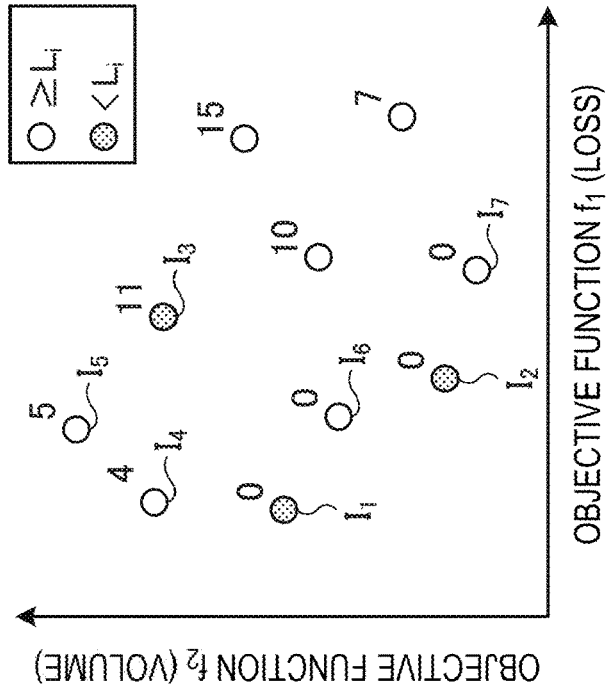

FIGS. 8A and 8B are for explaining an evaluation result change process. For example, the case where Strength Pareto Evolutionary Algorithm-II (SPEA 2) is used as an algorithm of two objective optimization will be described. In the multi-objective optimization algorithm, generally, ranking is given to solutions to perform a conformity determination. 0 is the Pareto optimum solution, and the smaller the number, the higher the rank. Even when applying other algorithms, basically the same way applies.

FIG. 8A illustrates the result of plotting individuals with the objective function as x axis (loss) and y axis (volume) immediately after the magnetic field simulation in the i-th generation. Each plot indicates a number indicating the ranking of the evaluation value on the right shoulder.

As illustrated in FIG. 8A, in SPEA 2, individuals (for example, individuals $I_1$ and $I_2$) relative to which there is no (few) other solutions in the lower left is highly evaluated, and has a small index value where the index is called ranking. However, in this state, although the individuals $I_1$ and $I_2$ do not satisfy the constraint condition value, they are ranked high. In contrast, although the individual $I_4$ satisfies the constraint condition value, it is ranked too low.

Therefore, the change circuit 136 excludes the individuals that do not satisfy the constraint condition at the time of assigning the ranking. For example, the optimization calculation device 10 excludes individuals falling short of the constraint condition value $L_i$, and then assigns a rank to the remaining individuals. In the example of FIG. 8A, the change circuit 136 excludes individuals $I_1$, $I_2$, $I_3$ whose inductance is less than $L_i$. As a result, as illustrated in FIG. 8B individuals $I_4$, $I_6$ and $I_7$ with inductance $L_i$ or more are Pareto optimum solutions.

In this way, the change circuit 136 intentionally gives a large index value (poor evaluation) to individuals that do not satisfy the constraint condition, thereby promoting selection. The change circuit 136 may perform a change process for degrading the objective function on individuals that do not satisfy the constraint condition.

After that, the selection circuit 137 selects, among from the individuals on which the determination processing by the determination circuit 135 or the change process by the change circuit 136 has been performed, the individuals to be the solution candidates in the i-th generation.

In this way, in a case where the first embodiment is applied to the inductor core 20, the optimization calculation device 10 receives an input of a dimensional condition of each member of a magnetic member formed of a magnetic material and a target inductance. The optimization calculation device 10 obtains, as optimum solutions, the dimensions of each member at which the magnetic loss and the volume of the magnetic member are minimized while securing the target inductance with the inductance as a constraint condition.

Application Results

Subsequently, the result of applying the optimization calculation process of the first embodiment to shape optimization of the inductor core will be described. This time, the number of individuals of each generation is 100, and the number of individuals (number of archives) used for generating the individuals of the next generation is 50. The constraint condition value (lower limit) $L_{tgt}$ of the final target inductance be 45 µH. Under this condition, the initial dimension (design variable) is given, and the loss and the volume are minimized while updating the inductance.

Figure 9:
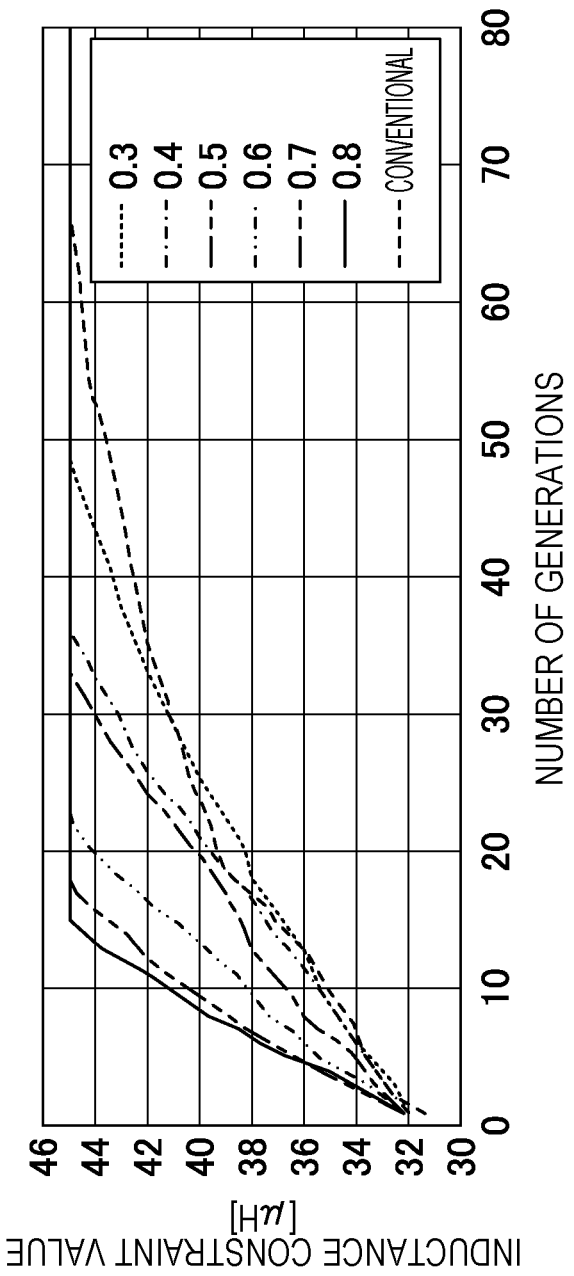
FIG. 9 is a diagram illustrating update profiles of constraint conditions for each generation.

FIG. 9 is a diagram illustrating update profiles of constraint conditions for each generation. FIG. 9 illustrates the update profile of the constraint condition corresponding to each K value when any coefficient K is changed between 0.3 and 0.8 using the optimization calculation method according to the first embodiment. A method described in Japanese Laid-open Patent Publication No. 2014-160399 is used as a conventional optimization calculation method. In the conventional method, all the individuals to be archived are set to satisfy the constraint condition.

As illustrated in FIG. 9, when updating profiles using the conventional optimization calculation method, more than 60 generations of calculation is required until the final target constraint condition value $L_{tgt}$ is reached.

In contrast, in a case where the optimization calculation method of the first embodiment is used, the constraint condition value $L_{tgt}$ is reached with less than 50 generations of calculation even when K is set to a moderate progress level of 0.3. In a case where the optimization calculation method of the first embodiment is used, the constraint condition value $L_{tgt}$ is reached in less than 20 generations when K is set to 0.7 to speed up the evolution.

In this way, in a case where the optimization calculation method of the first embodiment is used, the target constraint condition is reached two to three times faster or more depending on the value of K, compared with the case of the conventional method. Therefore, it has been found that the number of calculation frequencies according to the optimization calculation method of the first embodiment may be reduced, compared with that of the conventional optimization calculation method.

In a case where the first embodiment is applied, as K approaches 1, the proportion of individuals that satisfy the constraint condition is small (close to 50%), and the update pace of the constraint condition becomes fast. However, as K approaches 1, the evolution of the population will not catch up the pace and the stability may be impaired. In contrast, when K is close to 0 the opposite is true.

Since genetic algorithms also include random number factors, it is difficult to completely identify reproducibility. Despite this, when the first embodiment is applied, it is found that the speed of the update profile is improved by using up to about K=0.6 to 0.7. However, when using K=0.8, the degree of improvement is reduced. Reproducibility is poor at K=0.9 (not illustrated), and in some cases it is found that the population is not successfully induced to the constraint condition value $L_{tgt}$.

Figure 10:
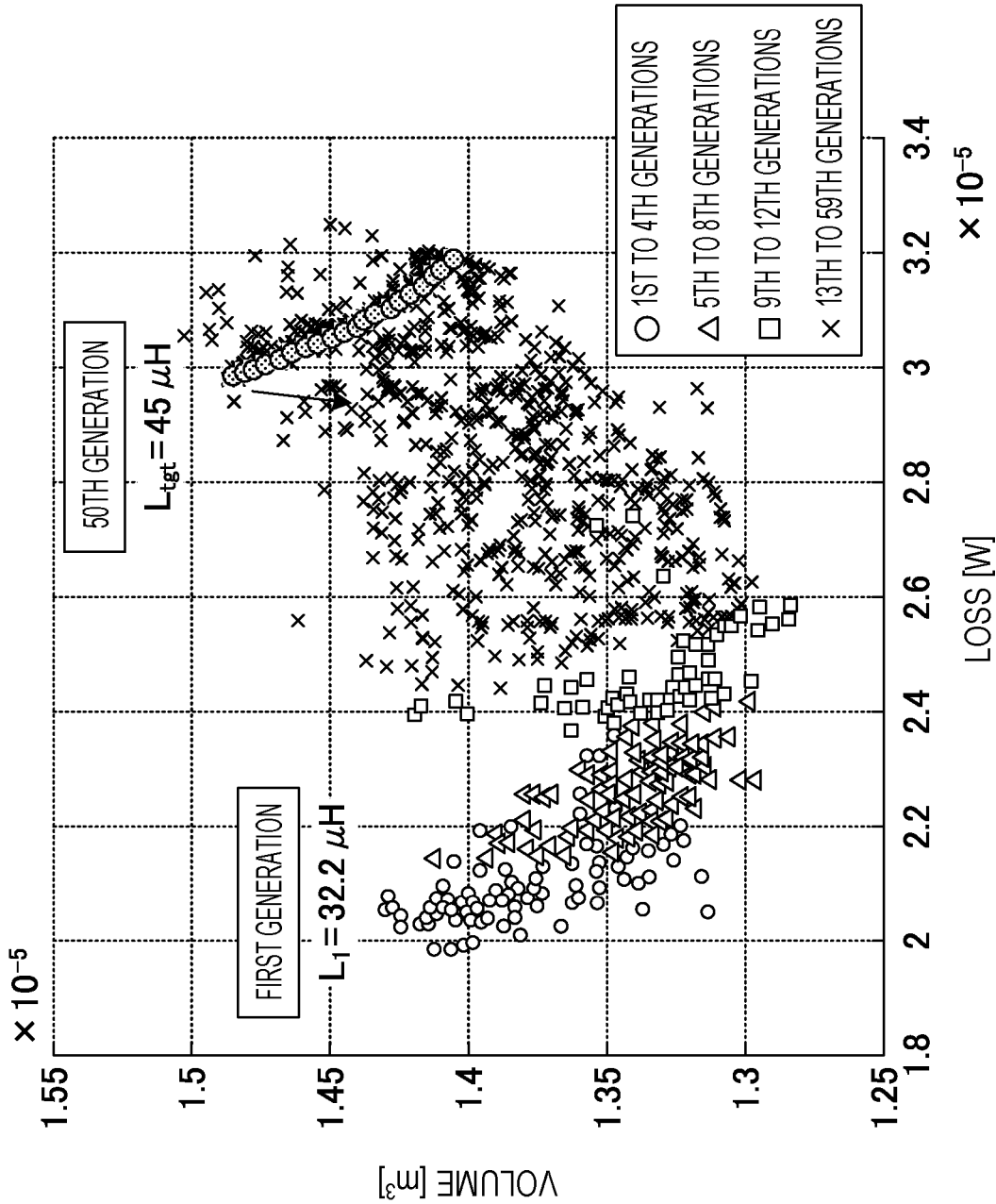
FIG. 10 is a diagram illustrating the relationship between loss and volume of each generation.

FIG. 10 is a diagram illustrating the relationship between loss and volume of each generation. In FIG. 10, losses and volumes which are objective functions are set on the x axis and the y axis, respectively, and the calculated values of the losses and the volumes of individuals obtained by performing calculation using the optimization calculation method of the first embodiment are plotted. In FIG. 10, the shape of the plot is changed for each generation phase. FIG. 10 illustrates an example in which K=0.5. The constraint condition value $L_{tgt}$ is 45 µH.

As illustrated in FIG. 10, in the first generation, the inductance is 32.2 µH, and the constraint condition is not satisfied. From this state, when applying the optimization calculation method for setting the constraint condition for each generation illustrated in the first embodiment, it is found that the population tends to smoothly move toward the final target constraint condition value $L_{tgt}$. Eventually, it is found in the 50th generation that the Pareto optimum front (Pareto solutions) is obtained with the final target constraint condition value $L_{tgt}$ (45 µH) or more.

Effects

In this way, the optimization calculation device 10 of the first embodiment dynamically changes the constraint condition for each generation in the optimization calculation method for calculating the optimum solutions of the problem in which individuals are generated using the genetic algorithm, and conformity to the constraint condition is found after evaluation of the generated individuals. Therefore, according to the optimization calculation device 10, since the constraint conditions are dynamically changed for each generation, it is possible to obtain optimum solutions stably by proceed with the change of generation while gradually adapting the population to the constraint condition.

On this occasion, the optimization calculation device 10 sets the constraint condition value of the present generation based on the constraint condition value of one generation before with respect to the present generation, and the constraint condition provisional value achieved by a half or more of the individuals used for generating the child individuals of the next generation. In this way, since the optimization calculation device 10 sets the constraint condition value of the present generation using the constraint condition value of one generation before with respect to the present generation and the constraint condition provisional value, it is possible to steadily proceed with a change of generation while properly leaving individuals highly likely to be selected as a parent individual in the next generation. Since the optimization calculation device 10 appropriately selects any coefficient relating to the progress of evolution, it is possible to shorten the calculation time, so that it is also possible to perform the calculation with high-speed.

When the present generation is the first generation, the optimization calculation device 10 stochastically more increases, in the initial population, the proportion of individuals that satisfy the constraint condition by setting the constraint condition value of the first generation to a value less than the constraint condition provisional value. In this way, since the optimization calculation device 10 increases, in the first generation, the proportion of individuals that satisfy the constraint condition, it is possible to proceed with the stable calculation without imposing the burden of initial value search on the engineer.

In the optimization calculation device 10, any coefficient K applied to Equation (1) may be set within a range from greater than 0 to 1 or less according to device resources and optimization problems. The optimization calculation device 10 may update the value of K for each generation, or may flexibly adjust the speed of evolution, for example, the calculation speed, for each generation.

Figure 11:
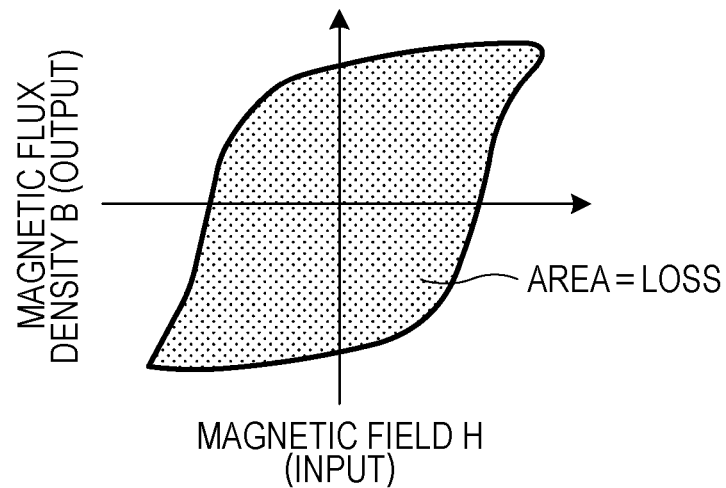
FIG. 11 is a diagram illustrating the relationship between a magnetic flux density and a magnetic field of a magnetic material.

The first embodiment may also be applied to design optimization of a magnetic device. FIG. 11 is a diagram illustrating the relationship between a magnetic flux density and a magnetic field of a magnetic material. As illustrated in FIG. 11, with an actual magnetic material, the magnetic permeability does not have a fixed value, is a function of the strength of the magnetic field, and indicates nonlinear characteristics (hysteresis). For example, the characteristics mean that when an alternating external magnetic field (horizontal axis) is given to the material, the area surrounded by the hysteresis curve is generated as energy loss.

In recent years, it is becoming important in high power circuits/devices of a power system that are required to have higher frequency and lower power consumption to design a magnetic material or a device in consideration of the hysteresis characteristics of this magnetic material is. However, it is becoming more difficult to determine the initial shape by predicting the hysteresis characteristics of the magnetic material beforehand in order to calculate the design optimization of the device using the magnetic field simulator than before. Even when redesign is performed by applying magnetic materials with improved hysteresis characteristics to conventional devices, the initial value largely deviates due to the reasons described above, and the conventional knowledge may not be used as it is.

As illustrated by the application results, the first embodiment may be usefully applied to the inductor core using the magnetic material having such characteristics. In other words, in the first embodiment, evolution of the population may be steadily and rapidly induced to the target constraint condition value even for design optimization of a magnetic device using a magnetic material whose initial value is difficult to search for and whose hysteresis characteristics is required to take into consideration.

Modification 1

In the optimization calculation device 10, it is also possible for the evaluation circuit 133 to actually create a prototype corresponding to each individual, and perform the characteristic evaluation of each individual.

Modification 2

Although the case where the shape optimization of the inductor core is performed has been described as an example in the first embodiment, the embodiment is not limited to this. The optimization calculation device 10 may also be applied to the optimization design of the motor.

When optimizing the design of the motor, the optimization calculation device 10 optimizes the shape so as to maximize the torque (force). In practice, it is required to obtain a smooth torque (so as not to cause cogging) at the time of rotation. For this reason, it is required to keep the difference between the maximum value $T_{max}$ and the minimum value $T_{min}$ within a certain value in addition to maximizing the torque T.

Therefore, the optimization calculation device 10 obtains, as an optimization, the size of the client member at which the torque is maximized while keeping the difference between the maximum value $T_{max}$ and the minimum value $T_{min}$ of the torque within a fixed value with the difference between the maximum value $T_{max}$ and the minimum value $T_{min}$ as a constraint condition. In this case, the constraint condition is set, for example, as in Equation (8).

$$(T_{max}-T_{min})/T \leq 0.05 \qquad (8)$$

Each Component of Respective Devices

Each component of the illustrated devices is functionally conceptual, and is not required to be physically structured as illustrated. For example, concrete states of distribution and integration of the units are not limited to those illustrated in the drawings, and all or part of the units may be configured to be functionally or physically distributed and integrated in any units depending on various loads and conditions in use. For example, each processing circuit of the control circuit 13 of the optimization calculation device 10 may be integrated as appropriate. The process of each processing circuit may be separated into the process of the plurality of processing circuits. All or part of each processing function performed in each processing circuit may be implemented by a central processing unit (CPU) and a program analyzed and executed by the CPU, or may be implemented by hardware by wired logic.

Optimization Calculation Program

Figure 12:
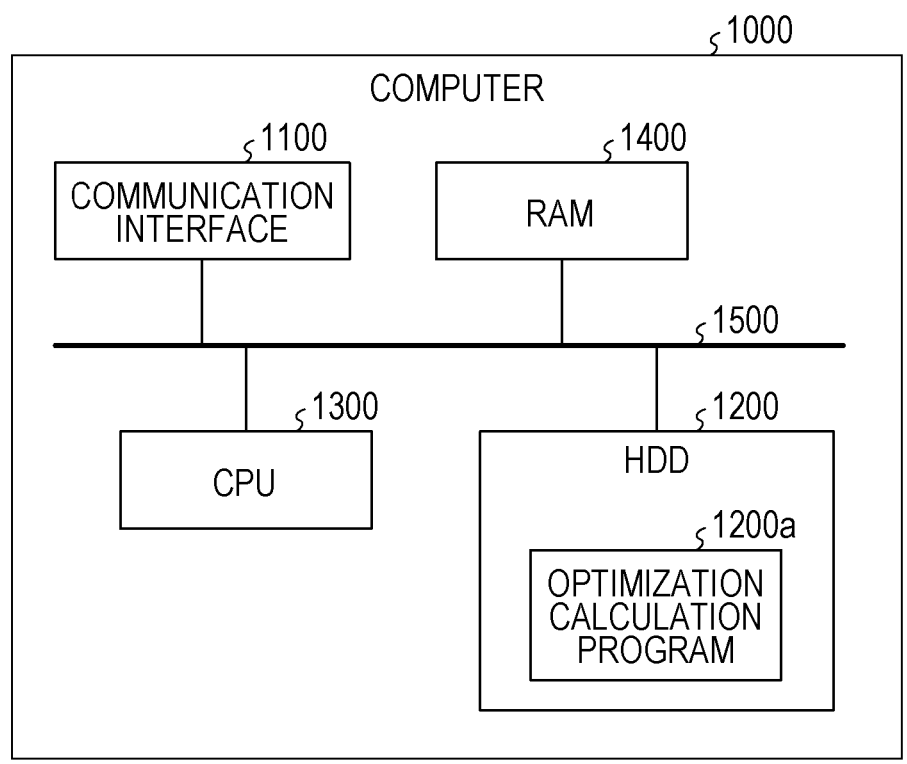
FIG. 12 is a diagram illustrating a computer that executes an optimization calculation program.

The various processes described in the above embodiments may also be implemented by executing a prepared program on a computer system such as a personal computer or a workstation. Therefore, in the following, an example of a computer system that executes a program having the same function as the above embodiment will be described. FIG. 12 is a diagram illustrating a computer that executes an optimization calculation program.

As illustrated in FIG. 12, a computer 1000 has a communication interface 1100, a hard disk drive (HDD) 1200, a CPU 1300, and a random access memory (RAM) 140. The units 1100 to 1400 are connected via a bus 1500.

An example of the communication interface 1100 includes a network interface card or the like.

The HDD 120 stores an optimization calculation program 1200a that exerts the function similar to that of the control circuit 13 of the optimization calculation device 10 in advance. For example, the optimization calculation program 1200a has a program that exerts the function similar to that of the optimization calculation device 10. The optimization calculation program 1200*a* may be separated appropriately. The optimization calculation program 1200*a* may further have a program that exerts the function similar to those of the communication circuit 11 and the memory 12 of the optimization calculation device 10.

The HDD 1200 stores various pieces of information. For example, the HDD 1200 stores various data used for request distribution of OS and range selection.

The CPU 1300 reads the optimization calculation program 1200*a* from the HDD 1200 and executes the program to perform the operation similar to that of each processing circuit of the embodiment. For example, the optimization calculation program 1200*a* performs the operation similar to that of the control circuit 13 of the optimization calculation device 10.

The optimization calculation program 1200*a* is not required to be stored in the HDD 1200 from the beginning.

For example, the program is stored in a "portable physical medium" such as a flexible disk (FD), a CD-ROM, a DVD disk, a magneto-optic disk, an IC card or the like which may be inserted into the computer 1000. The computer 1000 may read the program from the medium and execute the program.

Moreover, the program is stored in "another computer (or server)" or the like connected to the computer 1000 via a public line, the Internet, a LAN, a WAN, or the like. The computer 1000 may read the program from the medium and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization calculation method executed by a computer, the method comprising:
   generating individuals of a present generation based on a parent individuals selected in a previous generation by using an algorithm for obtaining optimum solutions while evolving a plurality of individuals for each generation, the plurality of individuals being solution candidates;
   evaluating each of the individuals of the present generation;
   setting a constraint condition value of the present generation acquired by weighting a constraint condition value of the previous generation, and a constraint condition provisional value differently as the evolving proceeds, the constraint condition provisional value being achieved by a half or more of individuals of the individuals used for generating child individuals of a next generation;
   determining whether an evaluation result of each of the individuals satisfies the constraint condition value of the present generation;
   performing a change for lowering an evaluation result of individuals which do not satisfy the constraint condition value of the present generation; and
   selecting individuals to be solution candidates from among individuals on which the determination process or the change process is performed.

2. The optimization calculation method according to claim 1, wherein the setting process includes setting the constraint condition value of the present generation using Equation (1)

$$L_i = (1-k) \times L_i + K \times L_i' \qquad (1)$$

where $L_i$: the constraint condition value of the present generation,
$L_{i-1}$: the constraint condition value of the previous generation,
$L_i'$: the constraint condition provisional value achieved by the half or more of individuals of the individuals used for generating the child individuals of the next generation, and
K: a coefficient regarding the evolving.

3. The optimization calculation method according to claim 2, wherein the setting process includes setting a constraint condition value of a first generation to a value less than the constraint condition provisional value when the present generation is the first generation.

4. The optimization calculation method according to claim 2, wherein the coefficient is a value greater than 0 and less than or equal to 1.

5. The optimization calculation method according to claim 4, wherein the coefficient is updated for each generation.

6. The optimization calculation method according to claim 1, wherein the optimization calculation method comprising:
   receiving an input of a dimensional condition of a member of a magnetic member formed of a magnetic material and a target inductance, and
   obtaining, as optimum solutions, dimensions of the member at which a magnetic loss and a volume of the magnetic member are minimized while securing the target inductance with the inductance as a constraint condition.

7. An optimization calculation apparatus comprising:
   a memory; and
   a processor coupled to the memory and configured to:
   generate individuals of a present generation based on a parent individuals selected in a previous generation by using an algorithm for obtaining optimum solutions while evolving a plurality of individuals for each generation, the plurality of individuals being solution candidates,
   evaluate each of the individuals of the present generation,
   set a constraint condition value of the present generation acquired by weighting a constraint condition value of the previous generation, and a constraint condition provisional value differently as the evolving proceeds, the constraint condition provisional value being achieved by a half or more of individuals of the individuals used for generating child individuals of a next generation,
   determine whether an evaluation result of each of the individuals satisfies the constraint condition value of the present generation,
   perform a change for lowering an evaluation result of individuals which do not satisfy the constraint condition value of the present generation, and
   select individuals to be solution candidates from among individuals on which the determination process or the change process is performed.

8. A non-transitory computer-readable recording medium storing a program that causes a processor included in an optimization calculation apparatus to execute a process, the process comprising:

generating individuals of a present generation based on a parent individuals selected in a previous generation by using an algorithm for obtaining optimum solutions while evolving a plurality of individuals for each generation, the plurality of individuals being solution candidates;

evaluating each of the individuals of the present generation;

setting a constraint condition value of the present generation acquired by weighting a constraint condition value of the previous generation, and a constraint condition provisional value differently as the evolving proceeds, the constraint condition provisional value being achieved by a half or more of individuals of the individuals used for generating child individuals of a next generation;

determining whether an evaluation result of each of the individuals satisfies the constraint condition value of the present generation;

performing a change for lowering an evaluation result of individuals which do not satisfy the constraint condition value of the present generation; and selecting individuals to be solution candidates from among individuals on which the determination process or the change process is performed.

\* \* \* \* \*